US005187634A

United States Patent [19]

Pitsch et al.

[11] Patent Number: 5,187,634

[45] Date of Patent: Feb. 16, 1993

[54] FAIL-SAFE PROTECTOR

[75] Inventors: Daniel M. Pitsch, Minneapolis; George B. Pfeffer, Minnetonka, both of Minn.

[73] Assignee: ADC Telecommunications, Inc., Minneapolis, Minn.

[21] Appl. No.: 811,876

[22] Filed: Dec. 16, 1991

Related U.S. Application Data

[63] Continuation of Ser. No. 748,109, Aug. 21, 1991, abandoned.

[51] Int. Cl.[5] ........ H02H 9/04

[52] U.S. Cl. ........ 361/119; 361/124; 361/120

[58] Field of Search ........ 361/119, 124, 120, 129, 361/127; 337/32, 29, 28

[56] References Cited

U.S. PATENT DOCUMENTS

| | | | |
|---|---|---|---|
| 4,851,957 | 7/1989 | Chung | 361/124 |
| 4,866,561 | 9/1989 | Doriral | 361/119 |
| 5,027,100 | 6/1991 | Neuwirth et al. | 361/124 |

*Primary Examiner*—Todd E. DeBoer
*Attorney, Agent, or Firm*—Merchant, Gould, Smith, Edell, Welter & Schmidt

[57] ABSTRACT

A fail-safe device is provided for an overvoltage protector element where the protector includes a body having first and second contact surfaces and a tip lead, a ring lead and a ground lead extending from the body. The fail-safe device includes a heat deformable dielectric base and an electrically conducted spring member having first and second contact ends. The base is disposed against the element body with the base having first and second spacer ends separating the spring's first and second ends from the protector body's first and second contact surfaces.

13 Claims, 5 Drawing Sheets

FAIL-SAFE PROTECTOR

This is a continuation of application Ser. No. 07/748,109, filed Aug. 21, 1991, now abandoned.

BACKGROUND OF THE INVENTION

1. Field of the Invention

This invention pertains to an overvoltage protector element for an electrical circuit. More particularly, this invention pertains to a fail-safe device for such a protector element.

2. Description of the Prior Art

In the telecommunications industry, the use of overvoltage and overload protectors is common to prevent damage or injury resulting from overvoltage conditions in a telecommunication line. Prior art for overvoltage protector elements include gas tube protector elements which have cylindrical bodies with a tip lead, a ring lead and a ground lead extending generally parallel from the body. During an overvoltage condition, the protector element grounds the tip and ring lead to the ground lead. A characteristic feature of such prior art overvoltage protector elements is that they attain an elevated temperature during periods of prolonged grounding A short period of grounding may result from a brief overvoltage condition. This could occur from lightening strikes. Prolonged grounding may result from prolonged overvoltage conditions. For example, a high voltage power line may fall and rest on a telephone line resulting in a prolonged overvoltage condition on the telephone line.

Any grounding through the gas tube will increase the temperature of the tube. Prolonged grounding resulting from prolonged overvoltage conditions will result in significant temperature increases. The increased temperature presents fire and other risks including personal injury exposure. To minimize these risks, prior art overvoltage protectors utilized so-called fail-safe devices. Such devices would by-pass the grounding of the gas tube and directly ground the tip or ring leads to the ground lead. As a result, extreme increases in the gas tube temperature would be avoided.

Prior fail-safe devices have utilized the elevated temperature characteristics of a failed overvoltage protector element. (Within this application, a failed overvoltage protector element means any element which is experiencing elevated temperature resulting from prolonged overvoltage conditions. The term does not necessarily mean a faulty element.) Specifically, such fail-safe devices used a spring contact having spring ends opposing contact surfaces which were connected to the tip and ring leads. The contact ends of the spring would be spaced from the contact surfaces by a dielectric spacer (for example a plastic disk). The dielectric spacer was made of a material which was deformable upon heating of the material to the elevated temperature. The spring would be connected to the ground lead. Upon failure of the overvoltage protector element, the dielectric material would melt and the spring ends would contact the contact surface resulting in a ground.

Overvoltage protector elements and their fail-safe devices are mass produced. Accordingly, it is desirable to find a design of such a product which can be manufactured and assembled at low cost. Furthermore, it is desirable to provide for design of such a product which has enhanced reliability in the event of failure of the overvoltage protector element to provide a ground.

Also, prior art fail-safe devices result in significantly enhanced operating temperatures. For example, the spring contact of the prior art fail-safe device was stainless steel. Such material is of relatively low conductivity. Also, the dielectric spacers were placed between the gas tube and the intended point of contact of the spring. During fail-safe operation, a thin film of melted dielectric could exist between the spring and the tube. This would lead to increased electrical resistance and resulting increased operating temperature.

II. SUMMARY OF THE INVENTION

According to a preferred embodiment, a fail-safe device is provided for an overvoltage protector element. The element includes a body with first and second electrical contact surfaces. The element further includes a tip lead, a ring lead and a ground lead extending from the body. The tip and ring leads are electrically connected to the first and second surfaces. The element further includes means for normal electrical connection of the tip and ring leads and for grounding of either of the tip and ring leads upon detection by the element of an overvoltage condition. The element is characterized by its attaining an elevated temperature in the event of prolonged overvoltage grounding. The fail-safe device comprises a base formed of a dielectric material which is deformable upon heating of the material to the elevated temperature. The fail-safe device further includes an electrically conductive spring member having spaced apart first and second contact ends. The base is disposed against the element body with the base having first and second spacer ends disposed against the first and second surfaces, respectively, of the element. The spring member is disposed against the base with the base maintaining the spring member and spaced electrically insulated separation from the element body. The first and second spacer ends electrically separate the first and second contact ends from the first and second surfaces, respectively. The contact ends are biased toward the first and second surfaces with a force sufficient for the contact ends to deform the spacer ends and make electrical connection with the surfaces upon the element attaining the elevated temperature. Electrical connection means are provided for electrically connecting the first and second contact ends to the grounding lead.

III. BRIEF DESCRIPTION OF THE DRAWINGS

IV. DESCRIPTION OF THE PREFERRED EMBODIMENT

Figure 1:
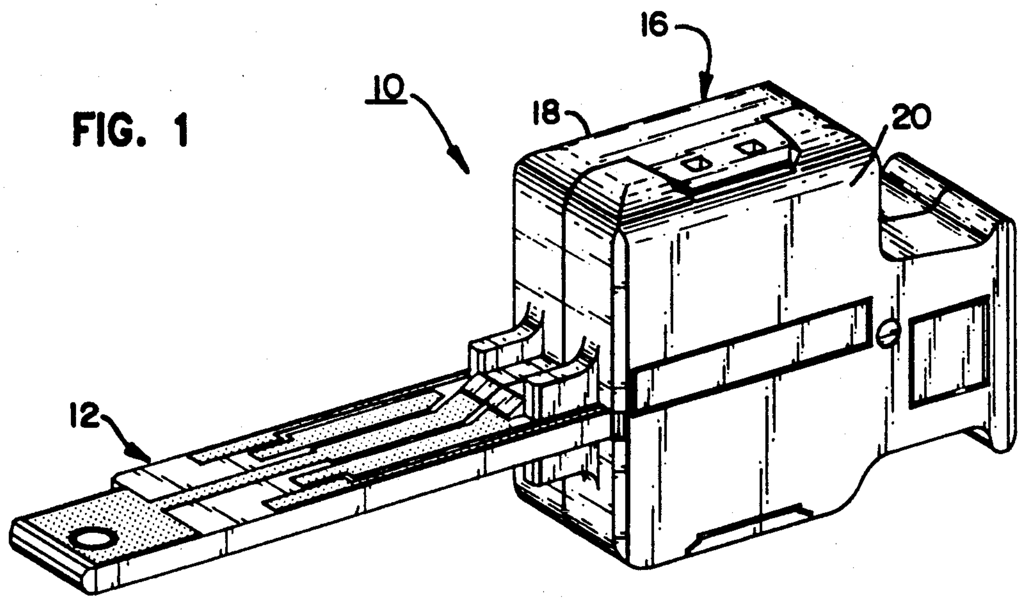
FIG. 1 is a perspective view of an overvoltage protector device including an overvoltage protector element and a fail-safe of the present invention.
Figure 2:
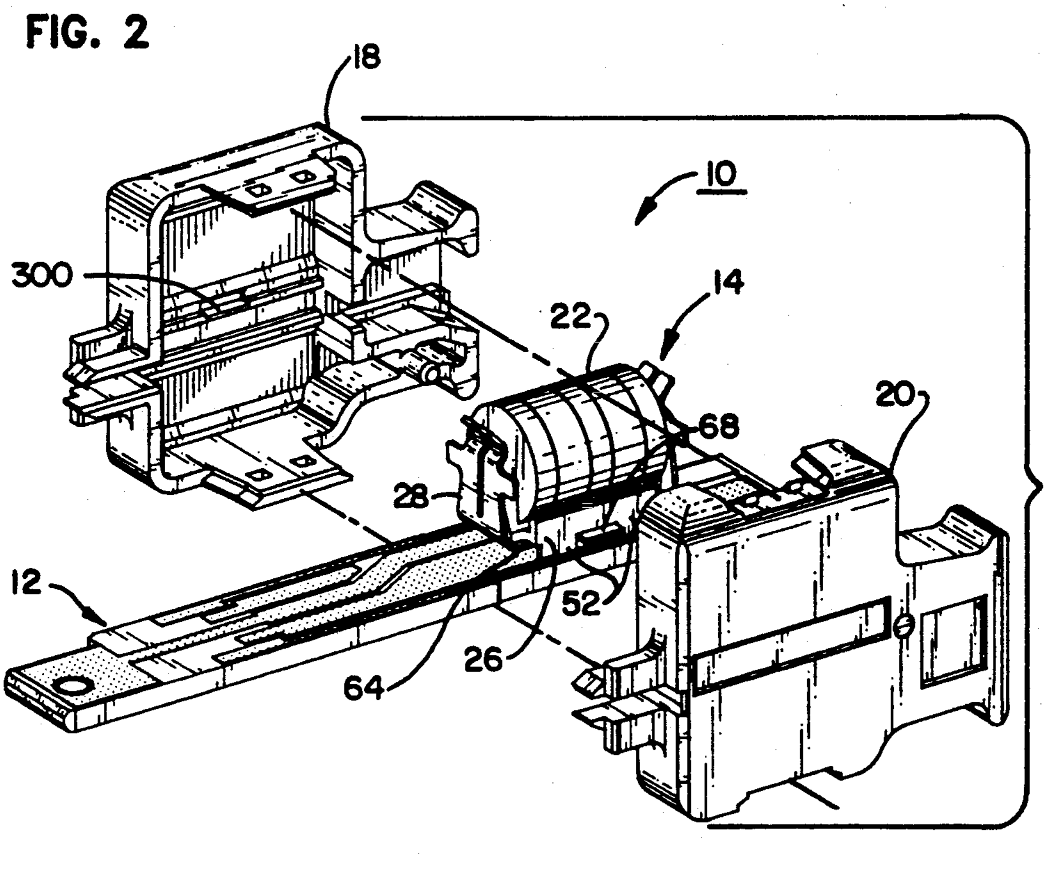
FIG. 2 is an exploded view of the device of FIG. 1.
Figure 3:
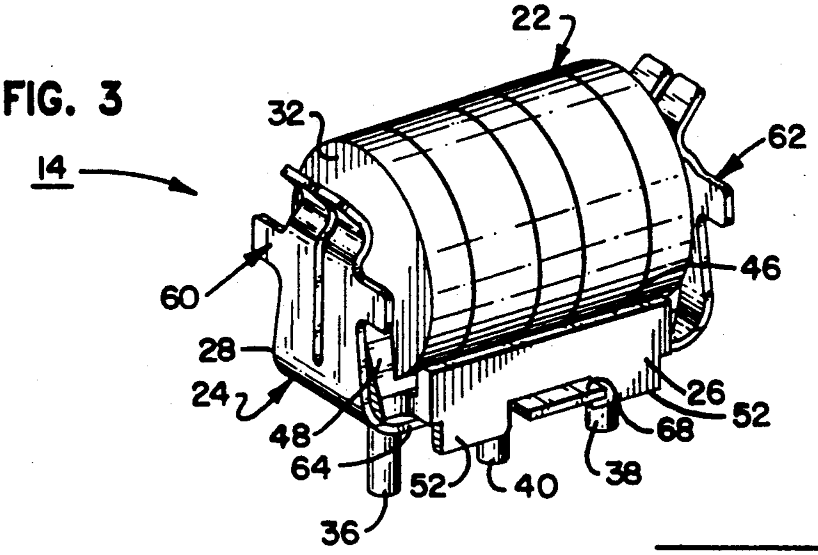
FIG. 3 is a perspective view of an assembled failsafe device and overvoltage protector element.
Figure 4:
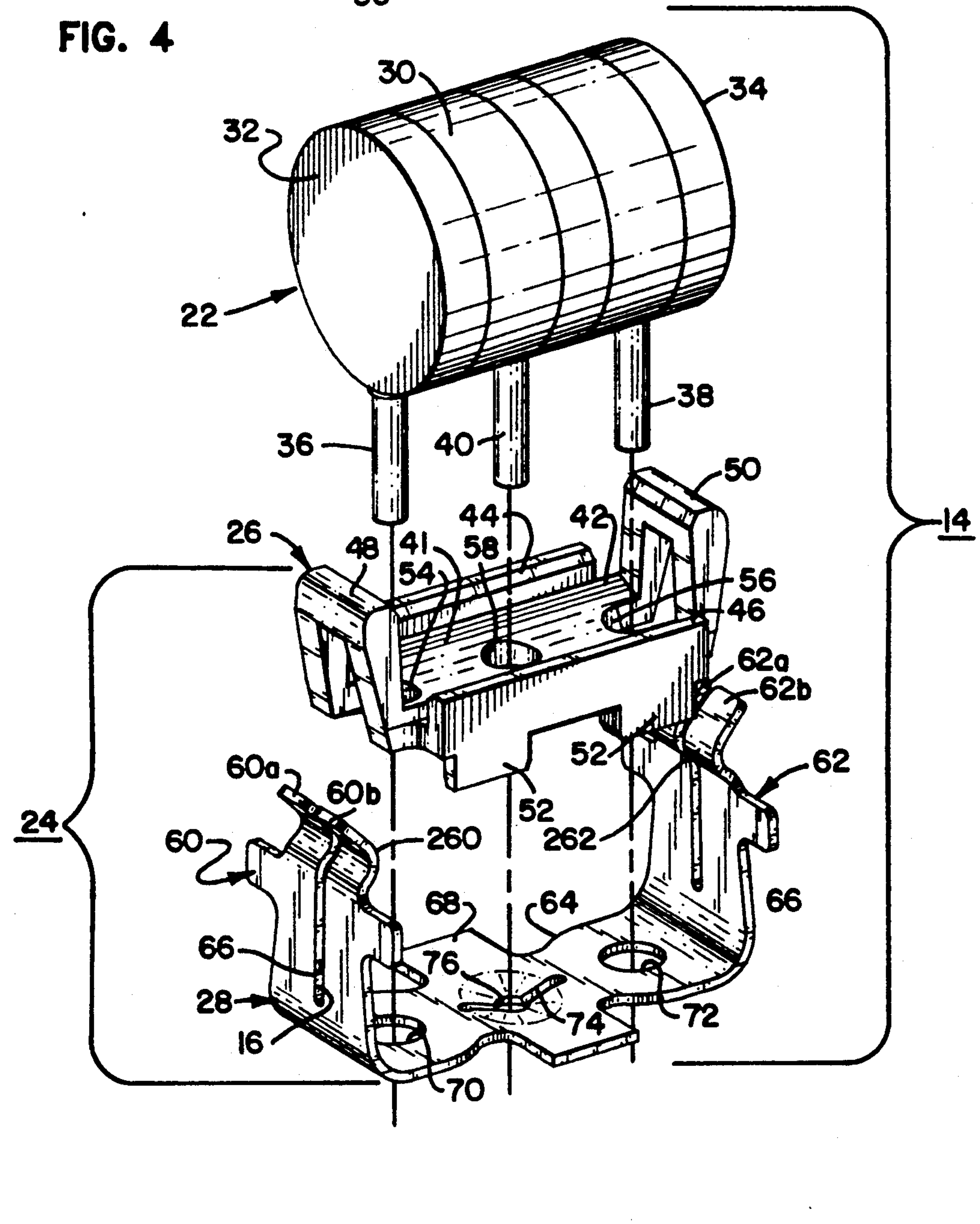
FIG. 4 is an exploded view of the assembly of FIG. 3.
Figure 5:
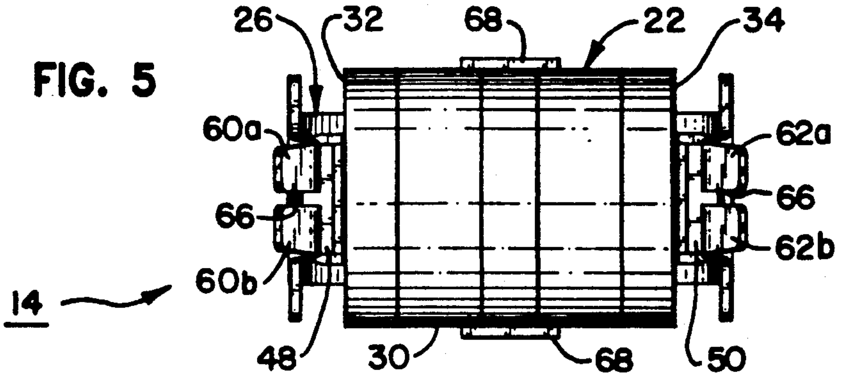
FIG. 5 is a top plan view of the assembly of FIG. 3.

With reference now to the various figures in which identical elements are numbered identically throughout, a description of the preferred embodiment of the present invention will now be provided. FIG. 1 and FIG. 2 show an overvoltage protector device 10 preferably for use with a connector block such as that shown in commonly assigned U.S. Pat. No. 4,741,711. (In FIG. 5 of the aforesaid patent, a gas tube protector element is shown without a fail-safe device.) The device 10 includes a printed circuit board 12 and an overvoltage assembly 14 (see FIG. 2). A housing 16 having mating halves 18 and 20 is provided to enclose assembly 14.

As shown best in FIGS. 3–8, assembly 14 includes an overvoltage protector element 22 and a fail-safe device 24. The fail-safe device 24 includes a base 26 (shown separately in FIGS. 10–15) and a spring member 28 (shown separately in FIG. 9).

The overvoltage protector element 22 is commercially available gas tube-type protector and includes a cylindrical body 30. The axial ends of the cylindrical body 30 define first and second electrically conductive contact surfaces 32,34.

The element 22 also includes a tip lead 36, a ring lead 38, and a ground lead 40. Leads 36,38, and 40 extend in a radial direction from body 30 with leads 36,38, and 40 in parallel and linear spaced apart alignment. Tip lead 36 is electrically connected to first electrical contact surface 32. Ring lead 38 is electrically connected to second electrical contact surface 34.

The element 22 includes means (not shown) for grounding either of the tip and ring leads 36,38 upon detection by the element 22 of an overvoltage condition. The element 22 is further characterized by the element 22 attaining an elevated temperature in event of prolonged grounding. It will be appreciated that elements 22 which provide for grounding in the event of an overvoltage condition and attainment of an elevated temperature in the event of prolonged grounding are well known in the art and form no part of this invention per se.

The base 26 (shown best in FIGS. 4, 6 and 10–15) is formed of a dielectric material which is deformable upon heating of the material to the elevated temperature achieved by the element 22 in the event of prolonged grounding. In a preferred embodiment, the material of base 26 is a thermoplastic material (e.g., a polyester). The base 26 includes a platform 42 having an upper or first surface 41 exposed between upwardly extending side walls 44,46. First and second spacer ends 48,50 are provided on opposite ends of the platform 42 and are upwardly extending therefrom. Projecting tabs 52 project downwardly from the bottom 43 of the platform 42.

Figure 6:
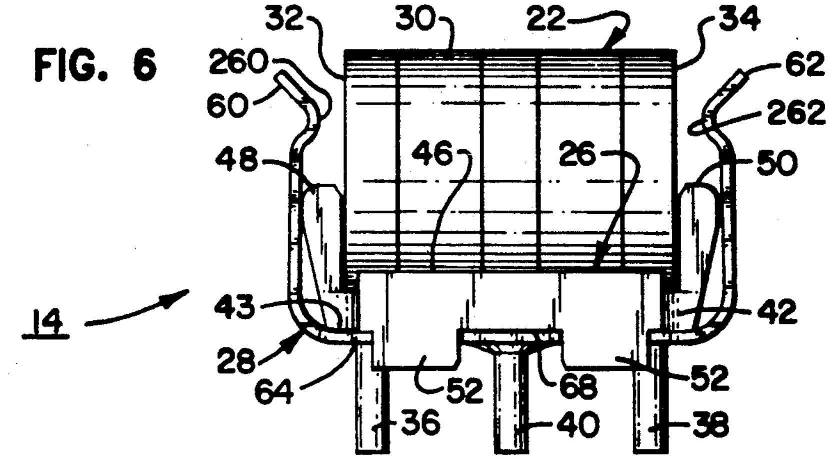
FIG. 6 is a side elevation view of the assembly of FIG. 3.
Figure 8:
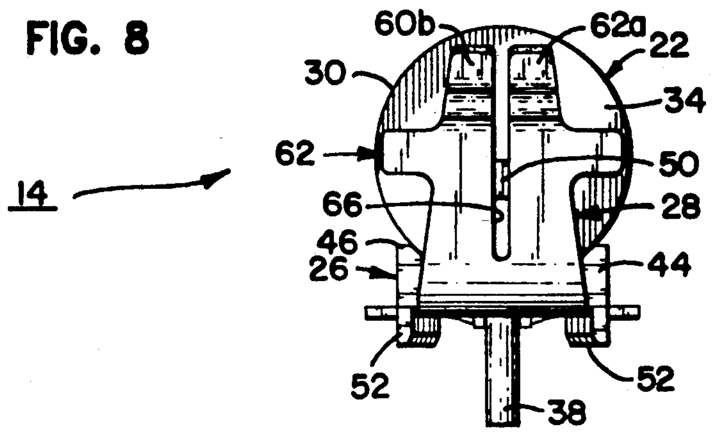
FIG. 8 is an end elevation view of the assembly of FIG. 3.

The platform 42 is sized for the cylindrical body 30 of element 22 to be received with its cylindrical surface abutting surface 41 and with sidewalls 44,46 supporting cylindrical body 30 (as best shown in FIG. 8) and with first and second spacer ends 48,50 abutting first and second electrical contact surfaces 32,34 (as best shown in FIG. 6). Platform 42 is provided with holes 54,56 and 58 sized to pass leads 36,38 and 40, respectively.

Figure 9:
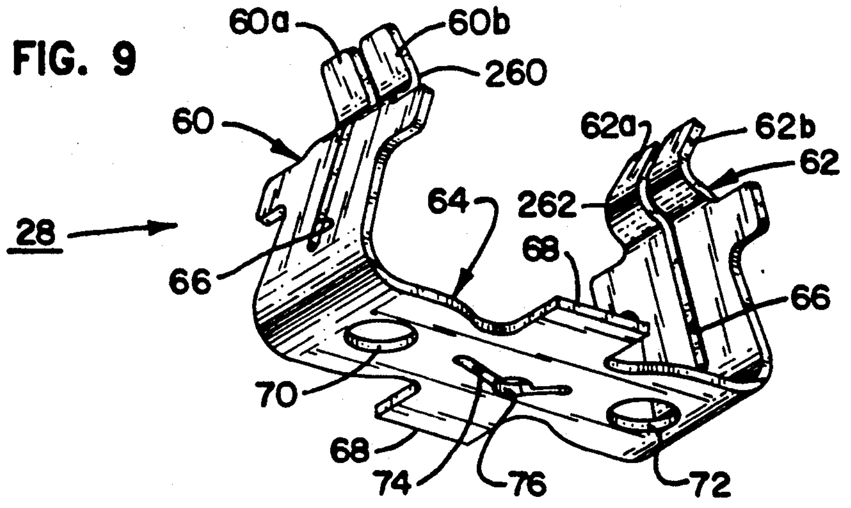
FIG. 9 is a perspective view of a spring member component of the present invention.
Figure 10:
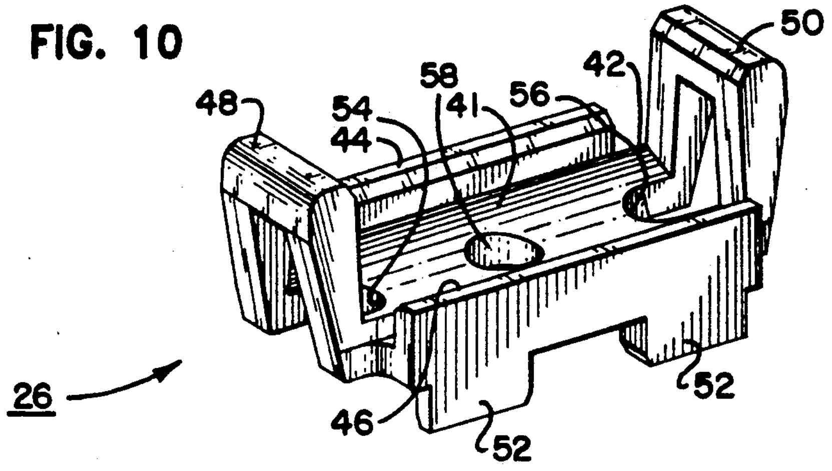
FIG. 10 is a top, end and side perspective view of a base component of the fail-safe device of the present invention.
Figure 11:
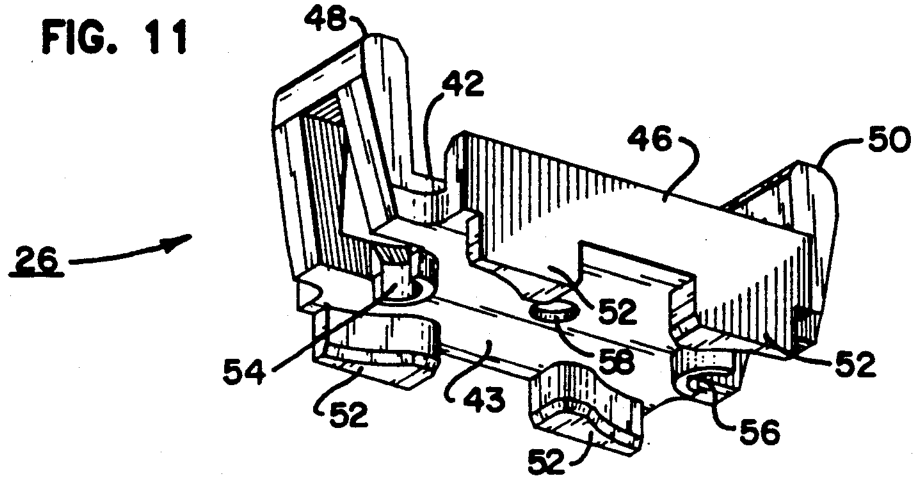
FIG. 11 is a bottom, end and side perspective view of the base of FIG. 10.
Figure 12:
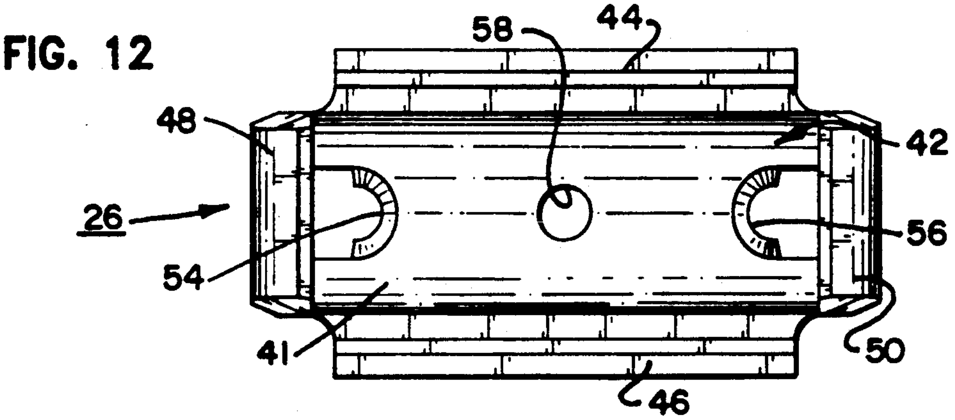
FIG. 12 is a top plan view of the base of FIG. 10.
Figure 13:
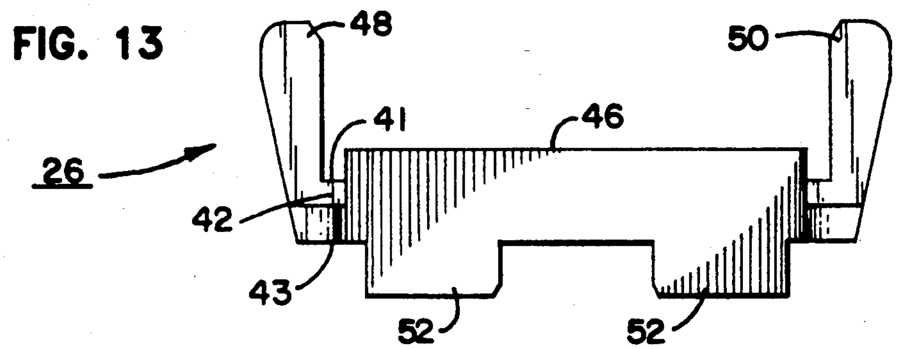
FIG. 13 is a side elevation view of the base of FIG. 10.
Figure 14:
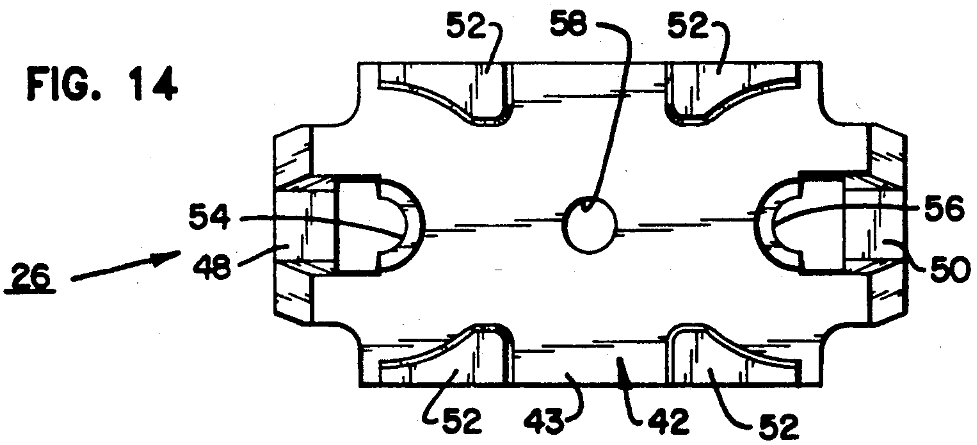
FIG. 14 is a bottom plan view of the base of FIG. 10.
Figure 15:
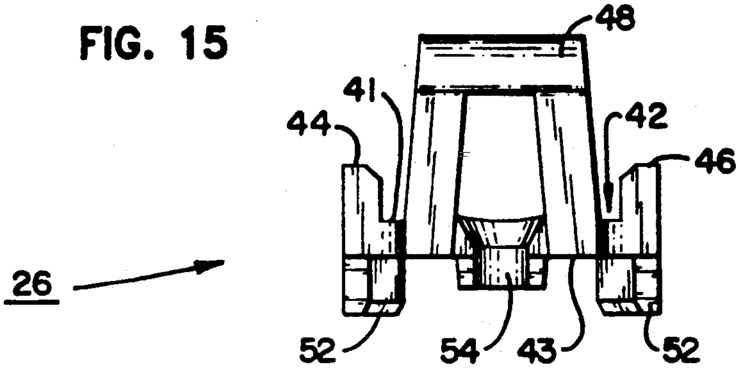
FIG. 15 is an end elevation view of the base of FIG. 10.

The fail-safe device 24 also includes the spring member 28 (shown separately in FIG. 9). The spring member 28 includes spaced apart first and second contact ends 60 and 62 joined by a spring body 64. The spring 28 is intricately formed and electrically conductive. In a preferred embodiment, the spring 28 is formed from beryllium copper. This material has much higher conductivity than the stainless steel commonly found in prior art fail-safe springs.

As shown, the first and second contact ends 60 and 62 are split finger contacts (however, non-split finger contacts are also usable). Namely, each of the contact ends 60,62 includes a longitudinally extending slit 66 which divides the contact ends 60,62 into contact fingers 60*a*,60*b* and 62*a*,62*b*. Laterally projecting spring alignment tabs 68 are provided on spring body 64 at a central location between contact ends 60,62.

First and second contacts 60,62 are biased toward one another and spaced apart at a rest position a distance sufficient for the contact ends 60,62 to electrically contact surfaces 32,34, respectively. As shown best in FIG. 6, the contact ends 60,62 have inwardly protruding contact portions 260,262 which provide the actual contact with surfaces 32,34 in the absence of a dielectric spacer (as will be described).

Spring body 64 is provided with holes 70,72 sized to freely receive and pass tip lead 36 and ring lead 38. The holes 70,72 are provided with a diameter such that they are spaced from leads 36,38 and out of electrical contact with leads 36,38.

Between tabs 68, body 64 is provided with a longitudinally extending slit 74 having a centrally disposed hole 76. Slit 74 and hole 76 are sized to receive ground lead 40 and electrically and mechanically engage ground lead 40.

FIG. 6 shows the assembly 14 of the overvoltage protector element 22 and the base 26 and spring member 28. As shown, the first and second spacer ends 48,50 urge the first contact ends 60,62 against their bias and away from surfaces 32,34. The platform 42 of base 26 provides a dielectric spacer between cylindrical body 30 and spring body 64. Leads 36,38 and 40 extend through holes 54,56,58, respectively (shown in FIGS. 10–11). Further, leads 36,38 extend freely through leads 70 and 72 without electrical contact with the spring 28. Ground lead 40 extends through hole 76 in electrical and mechanical contact with spring body 64. As a result, the mechanical connection of the ground lead 40 with the spring body 64 retains the assembly 14 in the assembled state as shown in FIG. 6.

As best shown in FIG. 6, the contact ends 60,62 are sized to be longer than spacers 48,50. Accordingly, no dielectric material is positioned between contact portions 260,262 and surfaces 32,34. As a result, contact portions 260,262 are held against this bias in spaced, unobstructed opposition from surfaces 32,34.

Figure 7:
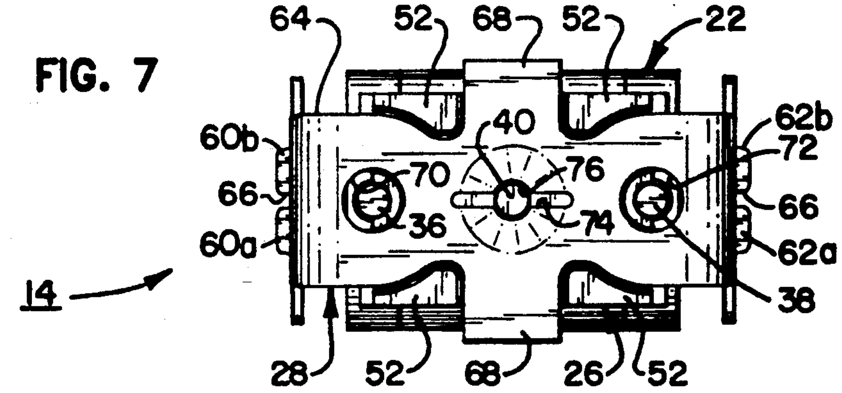
FIG. 7 is a bottom plan view of the assembly of FIG. 3.

With reference to FIG. 6 and 7, it is shown how the body tabs 52 and the spring tabs 68 cooperate to define an alignment means for aligning the element 22, spring 28 and body 26 during assembly. Specifically, the projecting tabs 52 have opposing surfaces which define a space to exactly receive the shape of the spring body 64 with its tabs 68 in predetermined correct alignment. Furthermore, the projecting tabs 52 act as a spacer means for the assembly 14. As best shown in FIG. 6, the projecting tabs 52 extend from bottom surface 43 a distance greater than a thickness of spring body 64. As a result, the tabs 52 space the spring body 64 from the printed circuit board 12 when the assembly 14 is connected to the printed circuit board 12 as shown in FIG. 2.

In addition to assist in alignment, tabs 68 assist in retaining the overvoltage assembly 14 on the printed circuit board 12. Namely, the assembly 14 is connected to board 12 by solder applied to leads 36,38,40. In the event of increased temperature due to overvoltage, the solder could melt. If the assembly 14 were inverted, the assembly 14 could fall out of the board 12. To prevent this, housing halves 18,20 are provided with slots 300 sized and positioned to receive tabs 68 (see FIG. 2). (In FIG. 2, only the slot 300 of half 18 is shown. It will be appreciated that half 20 has an identical slot functioning as slot 300). When housing halves 18,20 are joined, the tabs 68 are captured within slots 300 and prevent assembly 14 from falling from board 12 in the event solder contacts are melted.

Having described the structure of the present invention, it will be appreciated that in the assembled format shown in FIG. 6, the spring 28 is retained from electrical communication with printed circuit board 12 by projecting tabs 52. Similarly, first and second contact ends 60,62 are restrained against their bias from electrical connection with contact surfaces 32,34 by reason of spacers 48,50. The ground lead 40 is in electrical communication with the electrical spring 28. Further ground lead 40 provides mechanical connection with spring body 28 to retain the spring 28, base 26 and element 22 in assembled format.

During normal operation, in the event of a detected overvoltage condition, the element 22 will electrically connect either of leads 36,38 with the ground lead 40 to provide protection from the overvoltage condition. In the event of prolonged overvoltage grounding, the element 22 heats to a temperature which deforms the thermoplastic material of base 26 under the force of the bias of spring 28. As a result of the plastic deformation of base 26, the spring contacts 60,62 are urged by their bias to contact surfaces 32,34. As a result of this contact, electrical connection is provided between surfaces 32,34 and the ground lead 40 to thereby provide a fail-safe grounding in the event of failure of the electrical element 22.

It has been shown how a reliable fail-safe device 24 provides fail-safe grounding in the event of failure of an overvoltage protector element 22. Further, it has been shown how the structure of the various elements of the present invention insure ease of manufacturing and assembly of each of the elements. Further, the structure of the present invention provides ease of assembly of the fail-safe device to a printed circuit board since the device may simply be inserted onto a printed circuit board until the projecting tabs 52 contact the printed circuit board surface.

In addition, the structure of the invention adds enhanced performance. The highly conductive material of spring 28 reduces heat generated during fail-safe operation. Also, the unobstructed opposition of contact portion 260,262 and surfaces 32,34 result in reduced likelihood of a film of melted material from spacers 48,50 preventing high conductivity between portions 260,262 and surfaces 32,34. This also reduces the temperature of the fail-safe operation.

Having been shown how the object of the present invention have been attained in a preferred manner, it will be appreciated to those skilled in the art that the present invention need not be limited to the preferred embodiment. Instead, modifications and the equivalents of the disclosed concepts which will readily occur to one skilled in the art are intended to be included within the scope of the present invention.

What is claimed is:

1. A fail-safe device for an overvoltage protector element where said element includes a body having a first and second electrical contact surfaces, said element further including a tip lead, a ring lead and a ground lead extending from said body, said tip and ring leads electrically connected to said first and second surfaces, respectively, said element including means for grounding either of said tip and ring leads upon detection by said element of an overvoltage condition, said element characterized by said element attaining an elevated temperature during prolonged grounding, said fail-safe device comprising:

a base formed of a dielectric material which is deformable upon heating of said material at said elevated temperature;

an electrically conductive spring member having spaced apart first and second contact ends;

said base disposed against said element body with said base having first and second spacer ends integrally formed with said base and disposed against said first and second surfaces, respectively, of said element;

said base having a surface with raised sidewalls extending between said first and second spacer ends said surface and sidewalls sized to receive said protector element in a predetermined desired alignment between said first and second spacer ends;

said spring member disposed against said base with said base maintaining said spring member in spaced, electrically insulated separation from said element body;

said first and second spacer ends electrically separating said first and second contact ends from said first and second surfaces, respectively, with said contact ends biased toward said surfaces with a force sufficient for said contact ends to deform said spacer ends and make electrical connection with said surfaces upon said element attaining said elevated temperature; and electrical connection means for electrically connecting said first and second contact ends to said grounding lead.

2. A fail-safe device according to claim 1 wherein said spring member includes an electrically conductive spring body joining said first and second contact ends, said base member disposed between said spring body and said element body to electrically insulate said spring body from said element body; said electrical connection means including means on said spring body to receive and electrically connect with said grounding lead.

3. A fail-safe device according to claim 2 wherein said contact elements are diametrically opposed.

4. A fail-safe device according to claim 1 comprising alignment means for aligning said spring member and said base.

5. A fail-safe device according to claim 1 wherein said spring member is formed of beryllium copper.

6. A fail-safe device according to claim 1 wherein said dielectric material is a thermal plastic.

7. A fail-safe device for an overvoltage protector element where said element includes a body having a first and second electrical contact surfaces, said element further including a tip lead, a ring lead and a ground lead extending from said body, said tip and ring leads electrically connected to said first and second surfaces, respectively, said element including means for grounding either of said tip and ring leads upon detection by said element of an overvoltage condition, said element characterized by said element attaining an elevated temperature during prolonged grounding, said fail-safe device comprising:

a base formed of a dielectric material which is deformable upon heating of said material at said elevated temperature;

an electrically conductive spring member having spaced apart first and second spacer ends disposed against said said base disposed against said element body with said base having first and second spacer ends disposed against said first and second surfaces, respectively, of said element;

said spring member disposed against said base with said base maintaining said spring member in spaced, electrically insulated separation from said element body;

said first and second spacer ends electrically separating said first and second contact ends from said first and second surfaces, respectively, with said contact ends biased toward said surfaces with a force sufficient for said contact ends to deform said spacer ends and make electrical connection with said surfaces upon said element attaining aid elevated temperature;

electrical connection means for electrically connecting said first and second contact ends to said grounding lead;

said spring member includes an electrically conductive spring body joining said first and second contact ends, said base member disposed between said spring body and said element body to electrically insulate said spring body from said element body; said electrical connection means including means on said spring body to receive and electrically connect with said grounding lead; and said tip lead, said ring lead and said ground lead extend in generally parallel alignment and are disposed to pass through said spring member and said base with said tip and ring maintained in non-electrical conductive spacing from said spring member.

8. A fail-safe device for an overvoltage protector element where said element includes a body having a first and second electrical contact surfaces, said element further including a tip lead, a ring lead and a ground lead extending from said body, said tip and ring leads electrically connected to said first and second surfaces, respectively, said element including means for grounding either of said tip and ring leads upon detection by said element of an overvoltage condition, said element characterized by said element attaining an elevated temperature during a prolonged grounding, said fail-safe device comprising:

a base formed of a dielectric material which is deformable upon heating of said material at said elevated temperature;

an electrically conductive spring member having spaced apart first and second contact ends;

said base disposed against said element body with said base having first and second spacer ends disposed against said first and second surfaces, respectively, of said element;

said spring member disposed against said base with said base maintaining said spring member in spaced, electrically insulated separation from said element body;

said first and second spacer ends electrically separating said first and second contact ends from said first and second surfaces, respectively, with said contact ends biased toward said surfaces with a force sufficient for said contact ends to deform said spacer ends and make electrical connection with said surfaces upon said element attaining said elevated temperature;

electrical connection means for electrically connecting said first and second contact ends to said grounding lead; and said overvoltage protector element is disposed on a printed circuit board, said base having spacer means sized to space said spring member from said printed circuit board.

9. A fail-safe device according to claim 8 wherein said spacer means comprise projecting tabs extending from said base toward said printed circuit board with said tabs having a length greater than a thickness of said spring member.

10. A fail-safe device for an overvoltage protector element where said element includes a body having a first and second electrical contact surfaces, said element further including a tip lead, a ring lead and a ground lead extending from said body, said tip and ring leads electrically connected to said first and second surfaces, respectively, said element including means for grounding either of said tip and ring leads upon detection by said element of an overvoltage condition, said element characterized by said element attaining an elevated temperature during prolonged grounding, said fail-safe device comprising:

a base formed of a dielectric material which is deformable upon heating of said material at said elevated temperature;

an electrically conductive spring member having spaced apart first and second contact ends;

said base disposed against said element body with said base having first and second spacer ends disposed against said first and second surfaces, respectively, of said element;

said spring member disposed against said base with said base maintaining said spring member in spaced, electrically insulated separation from said element body;

said first and second spacer ends electrically separating said first and second contact ends from said first and second surfaces, respectively, with said contact ends biased toward said surfaces with a force sufficient for said contact ends to deform said spacer ends and make electrical connection with said surfaces upon said element attaining said elevated temperature;

electrical connection means for electrically connecting said first and second contact ends to said grounding lead; and alignment means for aligning said spring member and said base, said alignment means including a plurality of tabs projecting from said base and disposed for said tabs to receive said spring member between said tabs when said spring member and said base are in a predetermined desired alignment.

11. A fail-safe device for an overvoltage protector element where said element includes a body having a first and second electrical contact surfaces, said element further including a tip lead, a ring lead and a ground lead extending from said body, said tip and ring leads electrically connected to said first and second surfaces, respectively, said element including means for grounding either of said tip and ring leads upon detection by said element of an overvoltage condition, said element characterized by said element attaining an elevated temperature during prolonged grounding, said fail-safe device comprising:

an electrically conductive spring member having spaced apart first and second contact ends;

means for connecting said electrically conductive spring member to said protector element with intended contact portions of aid first and second contact ends opposing said first and second contact surfaces, respectively, and with said first and second contact portions biased toward electrical contact with said first and second contact surfaces;

means for electrically connecting said first and second contact ends with said ground lead;

first and second dielectric spacers formed of a dielectric material which is deformable upon heating of said material at said elevated temperature, said first and second dielectric spacers respectively disposed between said first contact end and said first surface and between said second contact end and said second surface with said first and second spacers respectively sized to urge said first and second contact ends away from said first and second surfaces and to maintain said first and second contact portions, respectively, in spaced non-electrical communication from said first and second contact surfaces, said first and second spacers further disposed to be located away from a path of travel of said first and second contact portions toward said first and second contact surfaces, respectively, for unobstructed movement of said first and second contact portions toward said first and second contact surfaces upon deformation of said first and second spacers.

12. A fail-safe device according to claim 11 wherein said spring member is formed of beryllium copper.

13. A fail-safe device according to claim 11 wherein said dielectric material is a thermal plastic.

* * * * *

UNITED STATES PATENT AND TRADEMARK OFFICE
CERTIFICATE OF CORRECTION

PATENT NO. : 5,187,634

DATED : February 16, 1993

INVENTOR(S) : Daniel M. Pitsch, et al.

It is certified that error appears in the above-identified patent and that said Letters Patent is hereby corrected as shown below:

Column 2, line 54, insert --device-- after the word "fail-safe";

Column 7, claim 7, lines 22 and 23, "spacer ends disposed against said" should read --contact ends;--;

Column 7, claim 7, line 38, "aid" should read --said--; and

Column 9, claim 11, lines 27, "aid" should read --said--.

Signed and Sealed this

Seventh Day of December, 1993

Attest:

Bruce Lehman

BRUCE LEHMAN

*Attesting Officer*

*Commissioner of Patents and Trademarks*